United States Patent Office 3,611,770
Patented Oct. 12, 1971

3,611,770
SWAGING MACHINE AND GRIPPING HEAD
Bruno Kralowetz, Weinleiten 142, St. Ulrich,
Steyr, Austria
Filed July 9, 1969, Ser. No. 840,420
Claims priority, application Austria, Aug. 1, 1968,
A 7,490/68
Int. Cl. B29b *39/24*
U.S. Cl. 72—76          8 Claims

ABSTRACT OF THE DISCLOSURE

A swaging machine comprises means defining a path for a workpiece to be swaged and a gripping head which comprises a gripping head frame, a spindle which is rotatably mounted in said frame and axially aligned with said path, gripping jaws carried by said spindle and adapted to grip a workpiece to be swaged, drive means coupled to said spindle and operable to rotate said spindle on its axis. Said drive means comprise a spring system which is arranged to permit of a torsional vibration of said spindle. A hydraulic brake is applicable to brake said spindle. A hydraulic system is operable to apply said brake.

---

Figure 1:
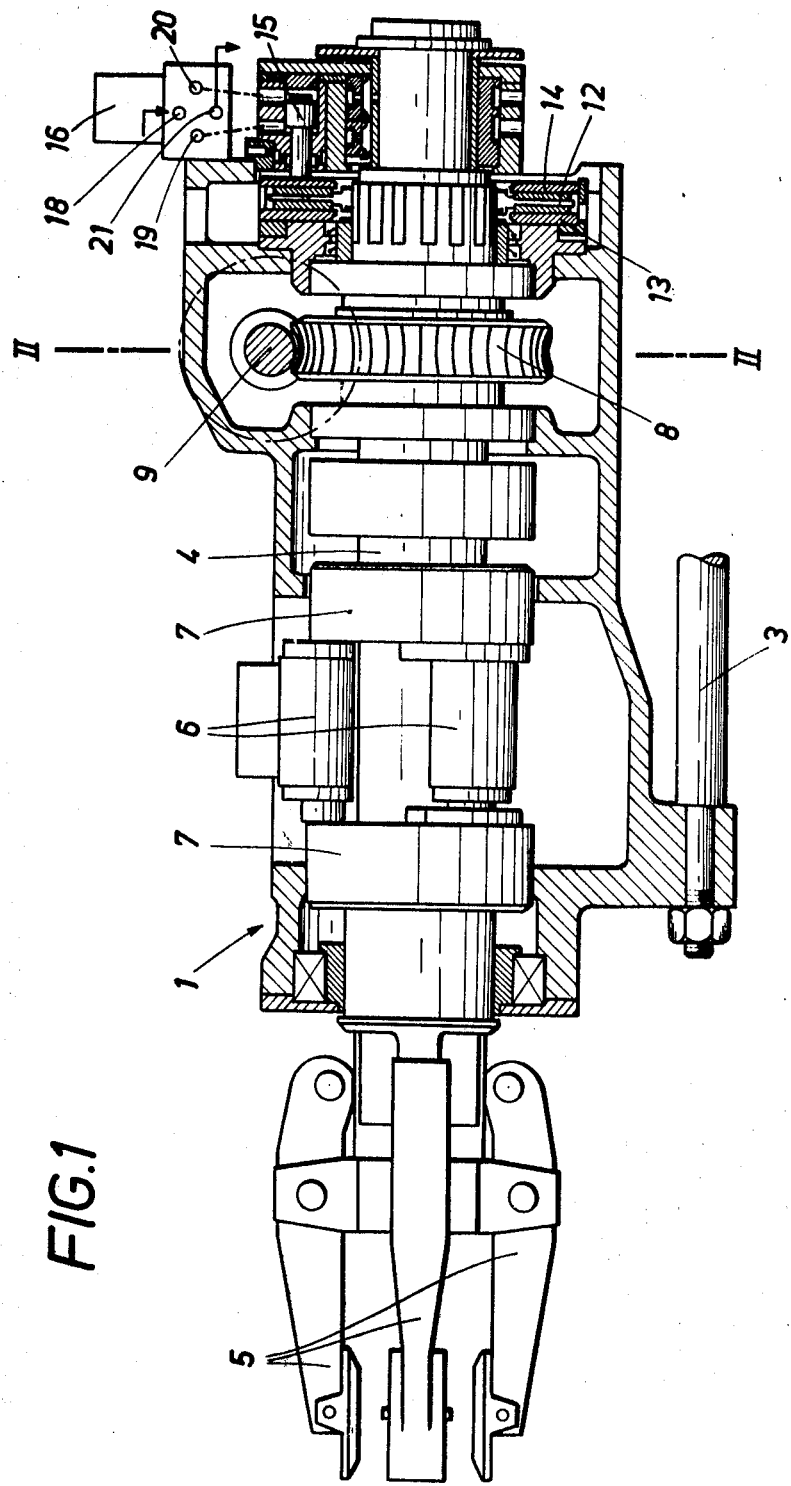

This invention relates to a gripping head for swaging machines having dies which blow radially against the workpiece and are preferably driven by eccentric shafts, in which gripping head the gripping jaws which grip the workpiece are secured to a rotatable sleeve or spindle, which sleeve or spindle is adapted to be driven through the intermediary of a spring system which permits of torsional vibration.

Such gripping head serves to move the workpiece between the dies in the direction of the axis of the workpiece and, in swaging operations intended to result in circular cross-sections, to impart to the workpiece a rotation about its own axis at the same time. For this reason, the gripping head is movable in the longitudinal direction of the workpiece and a rotational drive can be imparted to the sleeve or spindle provided with the gripping jaws when this is required. Upon each die blow, the workpiece is temporarily arrested, so that a uniform drive imparted to the sleeve or spindle would result in an undesired twisting of the workpieces. For this reason, the means for driving the sleeve or spindle incorporate a spring system, which enables a braking of the sleeve or spindle when the workpiece is arrested upon the die blow. The spring system is so designed that the automatic stoppage of the sleeve or spindle and of the workpiece at the instant of the die blow results from the superposition of the rotational movement imparted by the drive means and the oscillating movement which has the same frequency and is due to the spring system and the periodic stoppage of the workpiece upon the die blow.

It has now been found that an undesired excitation of the spring system will arise when inherently twisted stock is subjected to swaging operations resulting in rectangular or square cross-sections. This excitation will result in highly undesirable torsional vibration. Practice has also shown that in swaging operations carried out on workpieces which are soft in torsion because they are relatively small in diameter the torques which can be transmitted by the workpiece are often insufficient to vibrate the workpiece when this is desired because the workpiece is to be rotated in a swaging operation intended to produce a circular cross-section. As a result, the workpiece is twisted and must be rejected although the spring system is provided.

It is thus an object of the invention to eliminate these disadvantages and so to improve a gripping head of the kind set forth initially hereinbefore that the spring system will in no way be excited during swaging operations serving to produce polygonal cross-sections and involving no drive of the sleeve or spindle, whereas the desired torsional vibration will be reliably produced independently of the workpiece diameter during swaging operations serving to produce circular cross-sections.

To accomplish this object, it is suggested according to the invention in the first place to provide a hydraulically operable brake, preferably a disc brake, for the sleeve or spindle. This brake may be applied arbitrarily and ensures that torsional vibration will not occur in swaging operations carried out on stock of polygonal cross-section without a rotation of the workpiece because the sleeve or spindle which carries the gripping jaws is held in position by the brake.

In a development of the invention, an intermittent application of hydraulic pressure to the pistons for operating the brake is enabled by means of a valve, which is shiftable at the frequency of the die blows. During swaging operations for producing circular cross-sections, hydraulic pressure is intermittently applied to the pistons for operating the brake so that the latter is used to excite the spring system and produce the desired torsional vibration even if the torsional strength of the workpiece is not sufficient to transmit the braking forces required for a vibration from the dies to the spring system.

The valve consists in known manner of a solenoid valve, which is controlled by a voltage pulse generator, which is driven by a die-operating eccentric shaft so that the required synchronism between the motion of the valve and the die blows is accomplished with a small expenditure. The valve must obviously be controllable at the high frequency of the die blows. Such valves are already on the market.

According to the invention, the voltage pulse generator consists of a permanent magnet, which is secured to a disc or the like that is driven by a die-operating eccentric shaft, and a magnetic switch, which is mounted in a fixed position for angular adjustment relative to the permanent magnet and which comprises a contact which is closed in response to the approach of the permanent magnet and opened in response to the departure thereof. A network which includes that switch and properly arranged resistors and capacitors is used to produce a square-wave A.C. voltage, which serves to control the solenoid valve. The transmission results in a displacement in phase between the generation of the pulse and the beginning of the application of the brake. This phase displacement may be compensated by a rotation of the solenoid-operated switch. In a development of the invention, the permanent magnet is radially adjustable on the disc or the like and the magnet may be adjusted to prolong the time during which the magnetic switch is closed and the brake is applied.

Figure 2:
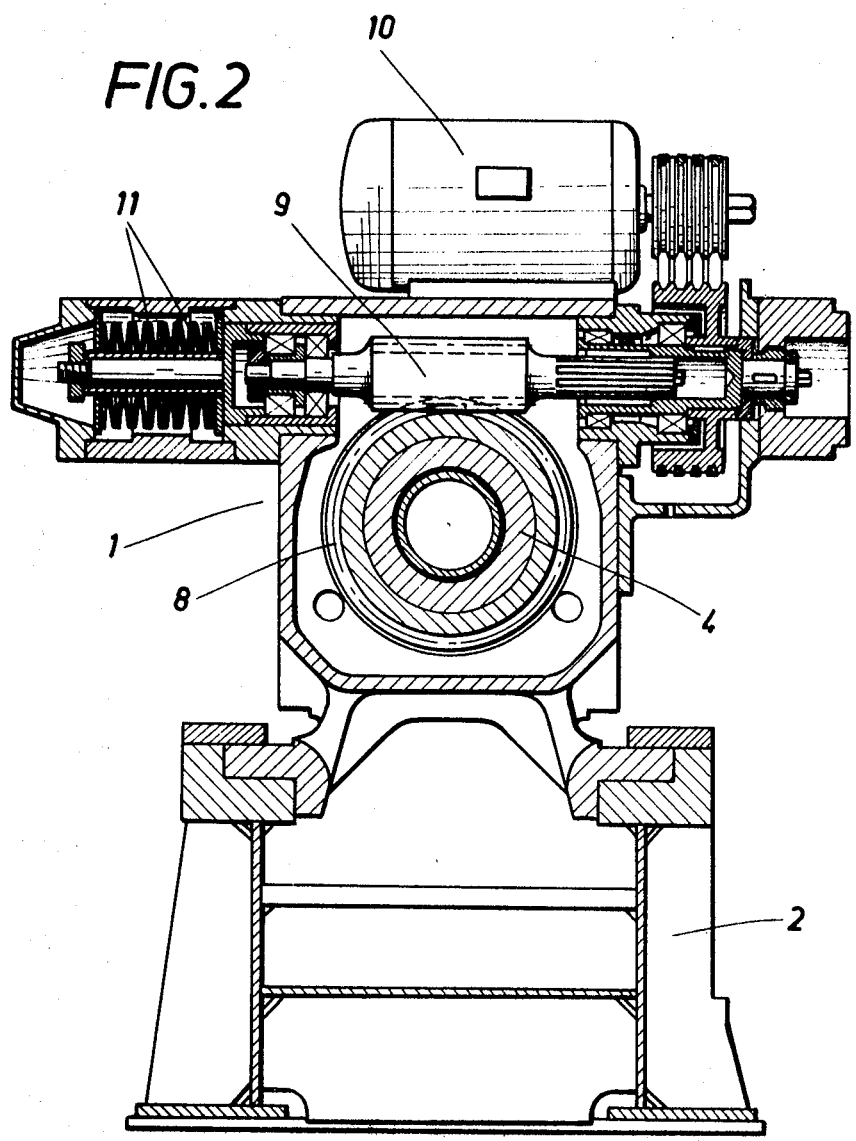
Figure 3:
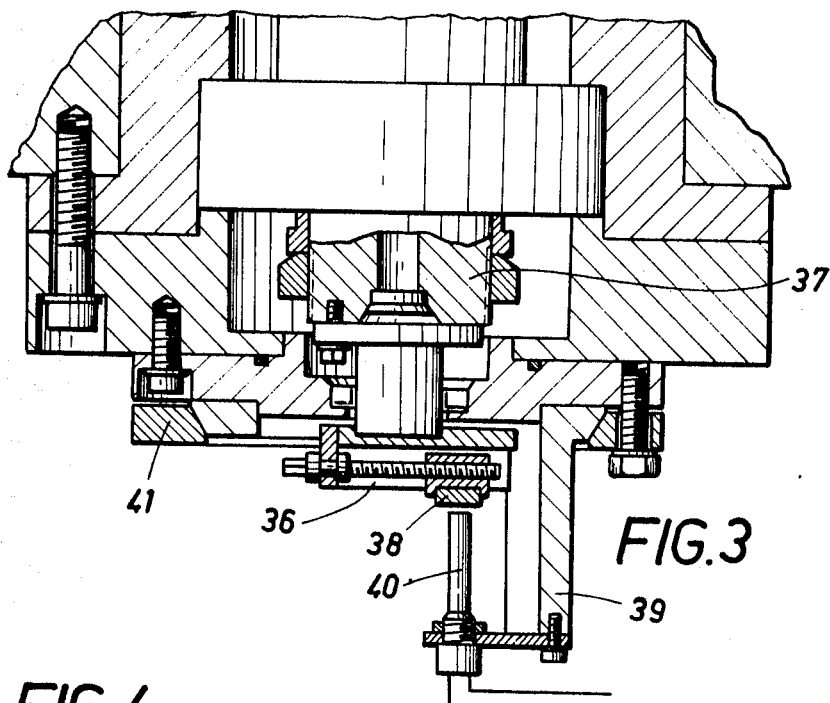
Figure 4:
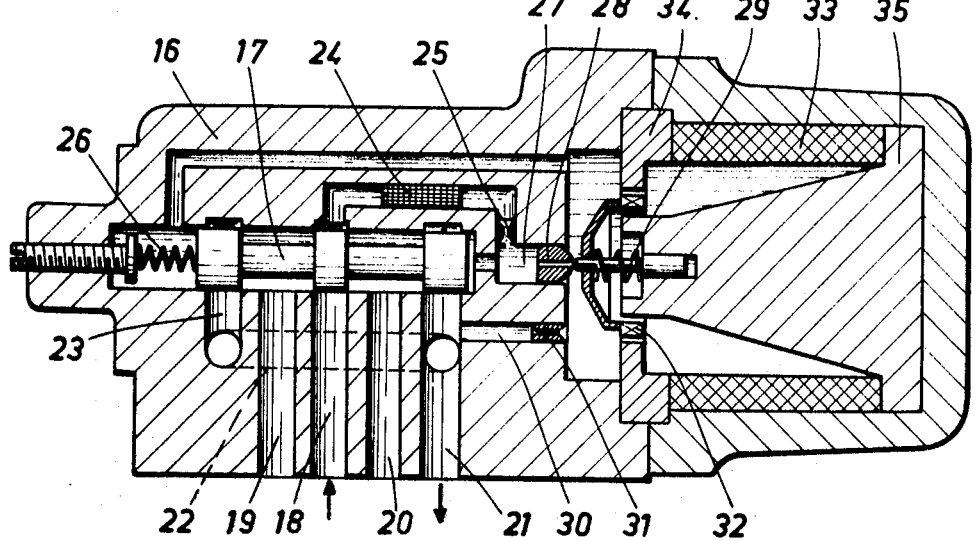

An embodiment of the invention is shown by way of example on the accompanying drawing, in which FIG. 1 is an axial sectional view showing the most important parts of a gripping head, FIG. 2 is a transverse sectional view taken on line II—II in FIG. 1, FIG. 3 is a view partly in section showing the arrangement of the voltage pulse generator for the valve and FIG. 4 is a diagrammatic sectional view showing the valve.

A gripping head generally designated 1 is guided on a machine bed 2 (FIG. 2) and may be displaced to and from a swaging box by a cylinder-piston unit, not shown, which comprises rods that are connected to the gripping head. A sleeve or tubular spindle 4 is rotatably mounted in the housing of the gripping head. The gripping jaws 5 for holding the workpiece are pivoted to the spindle 4. The gripping jaws may be opened and closed with the aid of three hydraulic cylinder-piston units 6, which act on two thrust sleeves 7. The tubular spindle 4 is driven by a motor 10 through a worm gear unit 8, 9. The worm 9 is axially slidable and bears on a set of disc springs 11. When the tubular spindle 4 is temporarily arrested upon a die blow, the worm 9 is displaced against the force of the set of springs 11 and slides back after the die blow. This operation results in the desired torsional vibration.

A brake disc 12 is axially slidably mounted on the spindle 4 for rotation therewith and is disposed between two non-rotatable brake rings 13, 14. For an application of the brake, the two brake rings 13, 14 are forced against each other from time to time by three pistons 15, which are regularly spaced around the periphery and to which hydraulic pressure is applied. The application of pressure to the pistons 15 is controlled by a valve 16, which is shown in FIG. 4 with the slide 17 in an intermediate position, in which it permits of an inflow of liquid under pressure through the bore 18. The bores 19, 20 connect the valve to the chambers at both ends of the pistons 15. An outlet bore 21 is connected by a transverse bore 22 to another bore 23. If the slide 17 is displaced, e.g., to the left, the pressure inlet conduit is connected to the bore 20 leading to the chamber at one end of the piston 15 whereas the liquid in the chamber at the other end of the piston 15 is exhausted through the bore 19, bore 23 and transverse bore 22 to the exhaust bore 21. A displacement of the slide 17 to the right results in an application of pressure to the piston 15 in the opposite direction. Liquid under pressure is conducted from bore 18 through a filter 24 and a constriction 25 to the right-hand end face of the slide 17. The pressure which is built up there balances the force of the spring 26. Another constricted bore 28 is adapted to be closed by a valve needle 29 and leads from the chamber 27 to a bore 30 having a constriction 31 and connected to a moving coil 32, which is disposed in the air gap of a permanent magnet 33 provided with pole pieces 34, 35. The moving coil 32 is directly connected to the output terminals of a voltage pulse generator (FIG. 3). Depending on the movement performed by the moving coil in response to the voltage applied, the outlet end of the constricted bore 28 is enlarged or further constricted so that the pressure in the chamber 27 and at the right-hand end of the spool varies and the latter is shifted in one direction or the other, as is desired.

FIG. 3 shows a die-operating eccentric shaft 37, to which a disc 36 or the like is coupled, on which a permanent magnet 38 is eccentrically secured for radial adjustment. A holder 39 carries a magnetic switch 40, which comprises a contact that is closed in response to the approach of the magnet 38 and opened in response to a departure of the magnet. The magnetic switch 40 is electrically coupled by resistors and capacitors to the moving coil 32 of the solenoid valve 16. When the locking ring 41 has been loosened, the holder 39 can be angularly adjusted relative to the disc 36.

What is claimed is:
1. In a swaging machine which comprises means defining a path for a workpiece to be swaged, a gripping head, which comprises
a gripping head frame,
a spindle rotatably mounted in said frame and axially aligned with said path,
gripping jaws carried by said spindle and adapted to grip a workpiece to be swaged,
drive means coupled to said spindle and operable to rotate said spindle on its axis, said drive means comprising a spring system which is arranged to permit of torsional vibration of said spindle,
a hydraulc brake which is applicable to brake said spindle, and
a hydraulic system which is operable to apply said brake.
2. A gripping head as set forth in claim 1, in which said spindle is tubular.
3. A gripping head as set forth in claim 1, in which said brake is a disc brake.
4. A swaging machine which comprises
means defining a path for a workpiece to be swaged,
die drive means,
a gripping head which comprises a gripping head frame mounted to be movable in the direction of said path,
a spindle rotatably mounted in said gripping head frame, gripping jaws carried by said spindle and adapted to grip a workpiece to be swaged, drive means coupled to said spindle and operable to rotate said spindle on its axis, said drive means comprising a spring system which is arranged to permit of torsional vibration of said spindle, and a hydraulic brake which is applicable to brake said spindle,
a hydraulic system which is operable to apply said brake, and comprises a piston which is coupled to said brake and operable to apply the same, and a valve which is operable to cause an intermittent application of hydraulic pressure to said piston, and
control means coupled to said die drive means and said valve and arranged to operate said valve in synchronism with said die drive means.
5. A swaging machine as set forth in claim 4, in which said die drive means comprise an eccentric shaft,
said valve consists of a solenoid valve, and
said control means comprise a voltage pulse generator arranged to be driven by said eccentric shaft.
6. A swaging machine as set forth in claim 5, in which said voltage pulse generator comprises
a magnet carrier secured to said eccentric shaft for rotation therewith,
a permanent magnet carried by said magnet carrier, and
a magnetic switch which is mounted in a stationary position adjacent to said permanent magnet and angularly adjustable relative thereto,
said switch comprising a set of contacts, which are arranged to be closed in response to the approach of said magnet and to be opened in response to the departure thereof.
7. A swaging machine as set forth in claim 6, in which said magnet carrier consists of a disc.
8. A swaging machine as set forth in claim 6, in which said permanent magnet is radially adjustable on said magnet carrier.

References Cited
UNITED STATES PATENTS

| | | | |
|---|---|---|---|
| 1,894,800 | 1/1933 | Stowe | 72—76 |
| 2,353,526 | 7/1944 | Tiedemann et al. | 72—422 X |
| 3,143,189 | 8/1964 | Ruple | 72—76 |
| 3,175,387 | 3/1965 | Wichmann et al. | 72—402 |

WILLIAM S. LAWSON, Primary Examiner

U.S. Cl. X.R.

72—422